United States Patent
Perner et al.

(10) Patent No.: US 7,795,750 B2
(45) Date of Patent: Sep. 14, 2010

(54) UNDERWATER POWER STATION AND METHOD FOR OPERATING AN UNDERWATER POWER STATION

(75) Inventors: Norman Perner, Neu-Ulm (DE); Benjamin Holstein, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/560,610

(22) Filed: Sep. 16, 2009

(65) Prior Publication Data

US 2010/0019499 A1 Jan. 28, 2010

Related U.S. Application Data

(63) Continuation of application No. PCT/EP2008/001002, filed on Feb. 9, 2008.

(30) Foreign Application Priority Data

Mar. 16, 2007 (DE) .................. 10 2007 013 293

(51) Int. Cl.
*F03B 13/10* (2006.01)
(52) U.S. Cl. .......................... 290/54; 290/43
(58) Field of Classification Search .......... 290/42, 290/43, 44, 53, 54, 55
See application file for complete search history.

(56) References Cited

U.S. PATENT DOCUMENTS

| | | | | |
|---|---|---|---|---|
| 5,798,572 A | * | 8/1998 | Lehoczky | 290/54 |
| 6,104,097 A | * | 8/2000 | Lehoczky | 290/54 |
| 6,551,053 B1 | * | 4/2003 | Schuetz | 415/3.1 |
| 7,105,942 B2 | * | 9/2006 | Henriksen | 290/55 |
| 7,352,078 B2 | * | 4/2008 | Gehring | 290/54 |
| 7,649,275 B2 | * | 1/2010 | Janca et al. | 290/43 |
| 2006/0153672 A1 | | 7/2006 | Davis | |

FOREIGN PATENT DOCUMENTS

| | | |
|---|---|---|
| DE | 809 179 | 7/1949 |
| DE | 10 2005 040 803 A1 | 3/2007 |
| GB | 2311566 A | 10/1997 |
| GB | 2 347 976 B | 9/2000 |
| JP | 55072665 A | 5/1980 |

OTHER PUBLICATIONS

International Search Report, PCT/EP2008/001002.

* cited by examiner

*Primary Examiner*—Nicholas Ponomarenko
(74) *Attorney, Agent, or Firm*—Taylor IP, P.C.

(57) ABSTRACT

A method an apparatus for operating an underwater power plant including a support structure; at least one turbine; at least one electric machine configured to be operated as a generator or a motor, the at least one electric machine being in an at least indirect drive connection with the at least one turbine and the at least one electric machine in a motive operation is configured to drive the at least one turbine to produce a propulsive power; and a spacer element between the at least one turbine and the support structure, wherein the at least one turbine is attached to one end of the spacer element and a pivot joint to the support structure is attached to an opposing end of the spacer element, a linkage point of the pivot joint having an eccentricity which is a lateral offset to a force action line of the propulsive power.

22 Claims, 7 Drawing Sheets

UNDERWATER POWER STATION AND METHOD FOR OPERATING AN UNDERWATER POWER STATION

CROSS REFERENCE TO RELATED APPLICATIONS

This is a continuation of PCT application No. PCT/EP2008/001002, entitled "UNDERWATER POWER STATION AND METHOD FOR OPERATING AN UNDERWATER POWER STATION", filed Feb. 9, 2008, which is incorporated herein by reference.

BACKGROUND OF THE INVENTION

1. Field of the Invention

The present invention relates to a method and apparatus for operating an underwater power plant, especially a power plant standing freely in an ocean current, dealing especially with a method and apparatus for adjustment to the change in the inflow direction caused by the tide and for moving towards a maintenance position.

2. Description of the Related Art

Free-standing, immersed power generation plants can be used economically from flow velocities of 2 to 2.5 meters per second. Water turbines with a propeller-like structure, for example, are fastened for this purpose to support structures for taking up kinetic energy from the ambient current. Depending on the water depth and the nature of the ground of the ocean, the support structures can be arranged, for example, as fixed pillars which are placed on a foundation in the ground. As an alternative, the support structures are merely anchored to the ground of the ocean by means of cable or chain systems and form floatable units floating at a certain depth in the water.

The relevant state of the art is known from DE 80 91 79 C, GB 23 11 566 A, U.S. 2006/0153672 A1 and U.S. Pat. No. 7,105,942 B2.

Characteristic for tidal currents is the regular change of direction of the current with ebb tide and flood tide. It is, therefore, necessary for efficient utilization of energy to arrange a respective free-standing underwater power plant driven by tidal currents in such a way that the up-take of energy by the water turbine from the current is possible with different inflow directions. For this purpose, two directions of current which face opposite of each other are principally relevant in ebb tide and flood tide.

In the simplest of cases, an anchored system which rotates freely about an anchoring point can be used for adjustment to the different directions of current. The disadvantageous aspect is, however, that a large circle of motion cannot be avoided in most cases and, therefore, such systems cannot be combined efficiently into an energy park with several underwater power stations. If stationary plants are used instead, and especially stations standing on a foundation, an adjustment to changeable directions of current will then be simple when the turbine is arranged as lee-side runners. In this case, a link joint is used for linking a spacer element to the support structure, with the turbine being fastened to the end on the off-stream side of the spacer element. This is typically a propeller-shaped turbine with two or more turbine blades which are arranged in the manner of rotor blades.

The disadvantageous aspect in a lee-side runner is that a certain shading effect by the support structure (tower shadow) cannot be avoided. Advantageous for reasons of efficiency is the use of a current-side runner, i.e. an arrangement of the turbine upstream and with a certain distance to the support structure, to which the same is fastened at least indirectly. However, there is no possibility for a current-side runner to make any passive readjustment with a changeable direction of inflow, so that the position of the turbine to the direction of the current needs to be guided actively. The drives known for this purpose usually comprise complex rotational concepts in the area of the tower. These are disadvantageous in view of the desire to produce underwater power stations requiring as little maintenance as possible because the additionally used gear and motor components lead to an increased probability for failure. Accordingly, there is higher expenditure for regular inspections, which themselves pose difficulties in view of the limited accessibility of underwater power stations.

Solutions have been sought to make the simplest possible adjustment of a free-standing tidal power station to an inflow from different directions. One proposal was to use a rotor-like turbine and to enable inflow from opposite directions via blade angle adjustment. Although this measure allows omitting the rotation of the entire turbine into the current, the problem of increased need for maintenance will be shifted due to additional moved components and the actuators associated with the same to a turbine-side apparatus, which is also susceptible to errors.

It is further desirable, in addition to adjustment to the direction of the current, to enable moving the turbine, and preferably a generator unit connected with the same, to a maintenance and mounting position. This requires, on the one hand, twisting out of the current and, on the other hand, in most cases a lifting of the turbine-generator unit to the water surface. Accordingly, the turbine will assume a certain relative position to the ambient current for initiating an inspection, so that even in this case the problems as explained above will occur.

What is needed in the art is a method and an apparatus which enable the turbine of a free-standing underwater power station to assume a relative position to the ambient current. Power up-take from the ambient current should be especially possible in the case of opposing main directions of current. Moreover, it is desirable to set an additional turbine position with reduced inflow, e.g. for initiating service measures. Further needed is a method which is carried out by means of a sturdy apparatus adjusted to long service intervals. Especially preferable is a substantially maintenance-free apparatus.

SUMMARY OF THE INVENTION

The present invention provides a method and apparatus for efficiently and effectively operating an underwater power plant, for example, a power plant standing freely in an ocean current, dealing in particularly with a method and apparatus for adjustment to the change in the inflow direction caused by the tide and for moving towards a maintenance position.

In accordance with the present invention, additional drive motors for active readjustment of a turbine, for example, a current-side runner relative to the direction of inflow, can be omitted when the generator unit, which is present anyway, is used as a drive for performing an actuating movement, which is motor-driven for this case.

When the electric machine, which is usually used as a generator, drives the turbine in motive operation, two effects will occur essentially. On the one hand, there will be a supporting moment of the electric machine. On the other hand, the driven turbine will generate propulsion. The supporting moment of the electric machine can be used for rotation of the gondola, but in most cases an intermediate gear will be necessary, so that the propulsion effect by the turbine will be used for setting the desired alignment of the turbine.

The turbine may be fastened at a certain distance to a pivot joint which allows a movement merely in one plane, and is aligned in such a way that, through the propulsive powers of the drive turbine, a torque is generated about the axle of the pivot joint. The pivot joint attached to the support structure has a certain lateral distance to the force action line of the propulsive power which is caused by the driven turbine. In other words, a spacer element between turbine and support structure is used which arranges the pivot joint offset transversally to the force action line by a certain distance, so that a lever arm is obtained. Therefore, in accordance with the present invention, during the drive of the turbine a tangential force component is present at the location of the introduction of the force of the turbine into the spacer element, as a result of which the torque required for the pivoting movement is obtained in the case of respective dimensioning of the lever conditions and the propulsive power of the driven turbine.

The thus obtained torque on the unit of turbine and spacer element leads to a pivoting movement between a first position and a second position about the pivot joint. The two positions will typically correspond to opposite inflow directions. Moreover, the pivoting movement is, for example, guided in a plane, which can be ensured by a respective arrangement of the pivot joint for the spacer element on the support structure. When the pivot joint is associated with a pivot axis, then it can extend vertically according to a first variant, so that the pivoting movement extends substantially in a horizontal plane.

A second embodiment of the present invention is to arrange the pivot joint in such a way that the axis of rotation extends horizontally, namely in a direction which extends perpendicular to the two opposite (anti-parallel) main directions of current (in the case of ebb tide and flood tide). The unit of turbine and spacer element is pivoted in this case in a vertical plane which the axis of rotation has as the normal to the surface. For this second embodiment of the present invention, the pivoting movement is guided at first to a lifting of the turbine up to an apex, whereupon it is lowered again to a second position.

According to a third embodiment of the present invention, a third position can be provided in the area of the apex which is approached, for example, for service purposes. When a rotor-like turbine is used, for example, it will have in this position a perpendicularly positioned hub and a horizontal orientation of the rotor blades. A separation from the spacer element can be made from this position, for example, in order to enable a lifting of the rotor-like turbine to the surface of the water. Alternatively, the pivoting movement can be performed in the vertical plane in such a way that the turbine performs a semi-circle through the bottom apex. The advantage of such a downward pivoting movement is that the turbine can be pivoted out of a shipping channel, for example, for the passage of a ship with a high draught when necessary.

Furthermore, the spacer element, which is provided between the fastening point of the turbine and the pivot joint on the support structure, can be used in its additional function for receiving the system components of the power generating unit in addition to the tasks mentioned above for creating eccentricity. For example, the electric machine which can be driven by generator and motor is received by the spacer element, as well as further components and possibly even gears which form the drive train between the turbine and the electric machine. Consequently, a fourth embodiment of the present invention is to arrange the spacer element as a gondola with an electric machine arranged therein.

According to a fifth embodiment of the present invention, the transition between the first position and the second position of the turbine occurs, in each case, as a reciprocating movement and not as a full circle, in order to avoid twisting of connecting cables between an electric machine integrated in the spacer element and the further guidance of the cable connection in the support structure. This fact is relevant both for lee-side runners as well as current-side runners, so that even in the case of a lee-side runner, a controlled, active forward and backward movement by means of the method and apparatus in accordance with the present invention is possible instead of passive adjustment to the current. It is necessary for the reciprocating movement between the first position and the second position to reverse the direction of force by the turbine, which is achieved by the respectively opposite rotation of the turbine.

According to a sixth embodiment of the present invention, mechanical stops are each provided on the positions to be approached for the unit consisting of the turbine and spacer element. They can additionally include a damping apparatus. In the event of a reciprocating movement between a first position and a second position, stationary mechanical stops can be used. If a third position is situated between the two positions in the pivoting circle which is passed over by the unit consisting of spacer element and turbine and which is only approached in special cases, such as the performance of a service measure or for pivoting the turbine to a neutral position, it is necessary to arrange a mechanical stop in this region in such a way that the same can be moved out of the pivoting range of the turbine. Moreover, locking elements are, for example, provided on the stops which securely prevent any backward pivoting during generator operation where the turbine takes up kinetic energy from the ambient current. The locking elements can be arranged either separately or form integral components with the mechanical stops.

According to a seventh embodiment of the present invention, a braking apparatus with effect on the pivoting movement is provided. In the simplest of cases, this will be a brake in the pivot joint. The advantage of such a braking apparatus is that the pivoting movement can be advantageously controlled, so that the pivoting movement caused by the driven turbine and the lever arm arrangement of the spacer element according to the present invention will not only be counteracted by inertia and current forces, but that the pivoting movement is substantially performed against a braking moment to be controlled or regulated. It is, therefore, possible to pass through the end phase before the new desired position is reached in an especially smooth manner.

In accordance with the present invention, stops can be omitted completely in the case of a respective configuration of the braking apparatus. This function can be replaced by a setting of the braking moment which is dependent on the pivoting angle. Moreover, fixing can be made via the braking apparatus instead of the locking elements. It is possible, however, to use such locking elements in addition as redundant securing measures when reaching the desired position.

For an eighth embodiment of the present invention, two or more connected turbines are used on a common support structure which can also be arranged as a current-side runner. The connection of the turbines can be made via a support beam, with the linkage point on the support structure being located in the middle of the support beam, for example. In order to rotate such an arrangement about the linkage point, at least one of the turbines is driven which is located at a certain distance from the linkage point. Alternatively, several or all turbines can be driven, with their directions of thrust or their directions of rotation respectively depending on the respective relative position to the linkage point. As an alternative, the rotation can occur about the longitudinal axis of the support beam in the case of the mentioned connection of several turbines by means of a support beam.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 4:
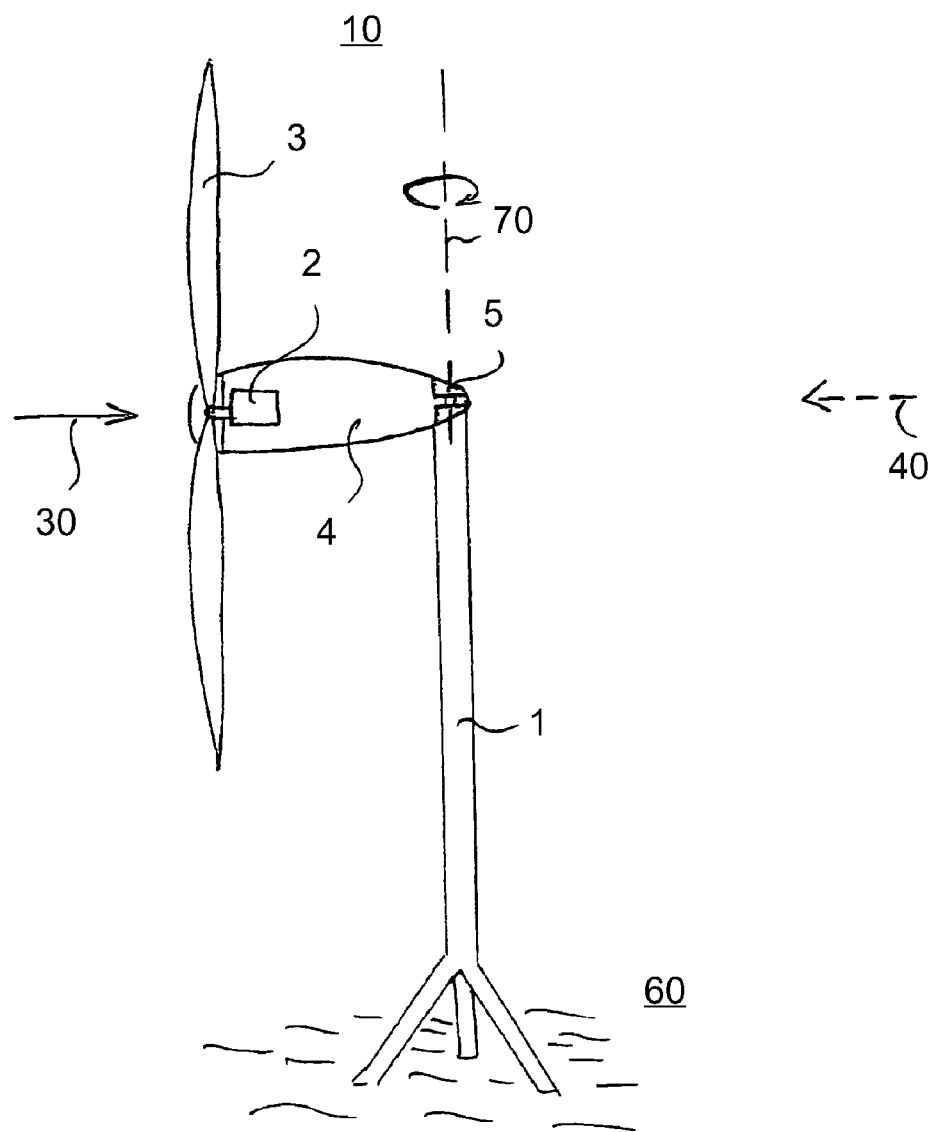
FIG. 4 shows a schematic simplified view of a side view of the underwater power station of FIG. 1.

Referring now to the drawings, and more particularly to FIG. 4, there is shown a generic, free-standing underwater power station in a schematic simplified view, including support structure 1 in the form of a support pillar and a foundation anchored to floor 60 of the ocean. Support structures 1 can also be arranged in a different way for the present application, e.g. as support grating structures or as anchored floating units, insofar as they are suitable to support pivoting turbine 3 with a certain distance from a linkage point.

FIG. 4 further illustrates first inflow direction 30 for turbine 3. Opposite of first inflow direction 30 there is a unit of turbine 3 and spacer element 4 for the illustrated operational situation in the, for example, current-side position for generator operation of the underwater power station.

A rotor-like structure with two propeller blades is shown in FIG. 4 as turbine 3. It is connected, for example, in a rigid manner with a rotor hub. The present invention can also be implemented with other turbine variants, e.g. vertical turbines or rotors with a pitch setting.

Spacer element 4 is located between turbine 3 and support structure 1. Spacer element 4 is arranged in the form of a gondola and can be used for receiving a generator. In order to implement the present invention, the generator is motively driven during a pivoting movement, so that subsequently the general term of electric machine 2 will be used which can be operated both as a generator and a motor. Further embodiments are possible in which electric machine 2 is not housed in direct vicinity of the turbine and is, thus, not housed in spacer element 4. Instead, it is received by support structure 1 and a mechanical driving connection via gear and joint structures is produced between turbine 3 and electric machine 2. As an alternative, it is possible to interpose a transmission element between turbine 3 and electric machine 2 which realizes the driving connection in an indirect way, e.g. via a hydrostatic intermediate circuit.

In order to adjust the underwater power station to a changing inflow direction which is shown in FIG. 4 with the broken line as second inflow direction 40, there is a pivoting movement of the unit consisting of turbine 3 and spacer element 4 about pivot joint 5 between spacer element 4 and support structure 1, in accordance with the present invention. The pivoting movement is guided in a plane, which in the present case is the horizontal plane, with the guide elements necessary for this purpose being created by the type of arrangement of pivot joint 5. Accordingly, pivot joint 5 is associated with axis of rotation 70 which extends vertically for the present embodiment. The pivoting movement can alternatively occur in a vertical plane, which is the subject matter of the embodiments of the present invention according to FIGS. 5, 6a, 6b.

Figure 1:
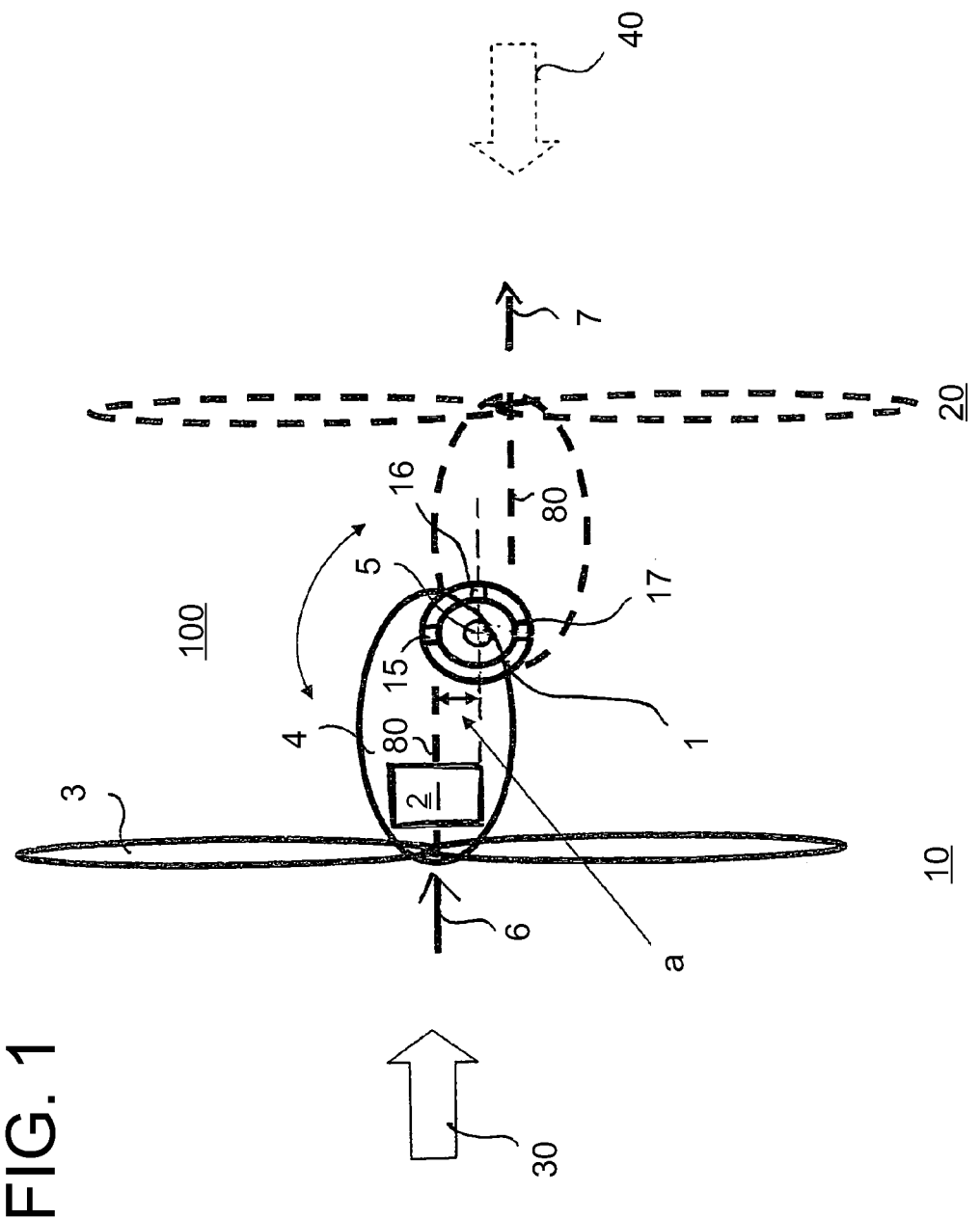
FIG. 1 shows an embodiment for an underwater power station in a top view, with two positions for different inflow directions being shown.
Figure 2:
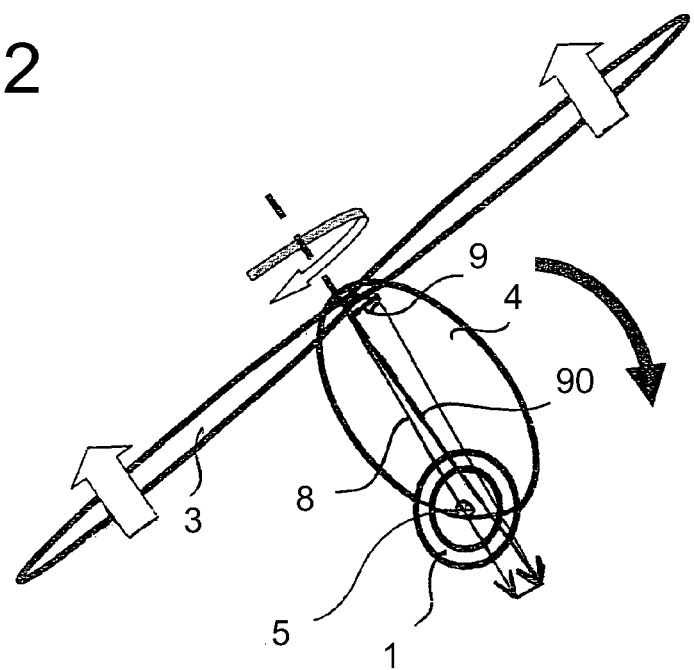
FIG. 2 shows the principle in accordance with the present invention for generating a moment for performing a pivoting movement of the turbine unit of an underwater power station in accordance with the invention.

In order to perform a pivoting movement, motively driven electric machine 2 drives turbine 3. The propulsion thus generated by turbine 3 in the form of a tractive force or thrust in conjunction with spacer element 4, which has linkage point on support structure 1, which is laterally offset to the force action line of propulsive power 90 generates a pivoting moment about the linkage point. This is shown in the schematically simplified diagram in FIG. 1. The underwater power station of FIG. 4 is shown in a top view, with the unit of turbine 3 and spacer element 4 being connected with support structure 1 via pivot joint 5. The linkage point on spacer element 4 is displaced laterally to force action line 80, namely by lateral offset a. Force action line 80 indicates the direction of the propulsive powers originating during the drive of turbine 3. The relevant aspect is that tangential force component 9 is obtained by lateral offset a, which is shown in FIG. 2 on the basis of a vectorial breakdown. Driven turbine 3 is shown which generates propulsive power 90, with propulsive power 90 being broken down into radial force component 8 and tangential force component 9. Radial force component 8 acts along the connecting line between the point of the introduction of force by turbine 3 on spacer element 4 and pivot joint 5. Tangential force component 9, which is perpendicular thereto, in conjunction with the lever arm, which is formed by the distance between force application point and pivot, leads to a pivoting moment which is shown in FIG. 2 via an arrow in bold print.

When a change occurs from first inflow direction 30 to second inflow direction 40, then it is necessary to bring the unit of turbine 3 and spacer element 4 from first position 10 to second position 20. For the situation as shown in FIG. 1, turbine 3 is driven for generating first propulsive direction 6 for the change from first position 10 to second position 20. For the return movement from second position 20 to first position 10, it is necessary to have turbine 3 revolve in the opposite direction of rotation for second propulsive direction 7.

Figure 3:
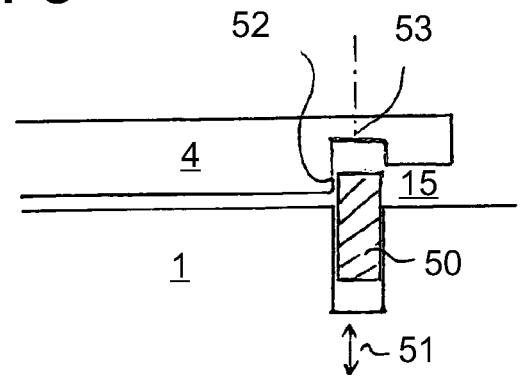
FIG. 3 shows a schematically simplified view of an embodiment of the present invention for a sunk module for realizing a stop for the pivoting movement and a locking element.

A mechanical stop each is, for example, provided which determines the end of a pivoting movement. These mechanical stops can be stationary apparatuses, against which rests a portion of the outside area of spacer element 4 or a component of pivot joint 5 at the end of the pivoting moment. An embodiment of the mechanical stops is possible, for example, which, on the one hand, is received by support structure 1 and, on the other hand, the same contact point, which means the same area on its outside, comes into interaction with the mechanical stop for each of the approached positions of the unit consisting of turbine 3 and spacer element 4. It is furthermore desirable, in addition to the mere mechanical stop function, to enable providing a locking function upon reaching the desired position. An embodiment according to the present invention uses sunk bolts 50 according to the illustration in FIG. 3. This leads to the advantage that the area of the stop and locking element can be passed over by the moved unit in an unobstructed way by completely entered bolt 50. Sunk bolt 50 is accordingly associated with bolt drive 51, which can move the bolt from the associated recess in support structure 1. When the respective counterpart, e.g. in spacer element 4, is arranged in such a way that stop surface 52 is present, sunk bolt 50 can be used as a mechanical stop for a first raised position according to the illustration in FIG. 3. When it is raised even further, it can be inserted for locking into bore 53 in the counterpart, which is typically spacer element 4, thus causing an arrest in the reached position.

An apparatus can additionally be provided on the pivoting device which is used to approach the end position in a smooth manner in the end phase of the pivoting movement. In the simplest of cases, a damping device in the form of rubber-elastic elements or hydraulic dampers will be associated with the mechanical stops. In addition to this, or alternatively, it is possible to provide a braking device for controlling or regulating the pivoting movement.

For the embodiment of the present invention as shown in FIG. 1, stop and locking elements are arranged on the support structure at the positions shown with reference numerals 17.1, 17.2 and 17.3. Stop and locking element 17.1 is associated with first position 10 and stop and locking element 17.3 with second position 20. After the locking, the element consisting of turbine 3 and spacer element 4 is fastened to two points on support structure 1. On the one hand, this is pivot joint 5 and, on the other hand, this is the mentioned stop and locking element.

According to a further development of the present invention, several positions of the unit of turbine 3 and spacer element 4, which can be reached by the pivoting movement, can be fixed by the arrangement of several, pivoting stop and locking elements. This can be used, on the one hand, for refined adjustment to a changing inflow direction. On the other hand, an additional interposed position for maintenance cases can be provided between the two main positions for generator operation. Stop and locking element 17.2 is shown by way of example for this purpose in FIG. 1. When the allocated position of the unit of turbine 3 and spacer element 4 is approached, the hub of turbine 3 rests on stop and locking element 17.2 substantially perpendicular to the main directions of inflow (first and second direction of inflow 30, 40) in the case of a pivoting about a vertically extending axis of rotation, so that maintenance can be performed. The components necessary for this purpose are not shown in FIG. 1.

Several stop and locking elements can also be used for this purpose to perform a readjustment for determining first inflow direction 30 and second inflow direction 40 for optimizing performance in the case that the conditions of the currents were not surveyed precisely prior to the erection of the power generating plant. According to an alternative embodiment, it is possible to connect the stop and locking elements via a rotatable element with the support structure, so that during the set-up of underwater power station 100, there is a possibility for adjusting the position of the components and, thus, an adjustment to the given current conditions. When the mentioned mechanical stops are replaced by a braking apparatus, then first position 10 can be chosen in a substantially free manner for first inflow direction 30 and second position 20 for second inflow direction 40. Moreover, a refined adjustment to an elliptical performance profile of the ambient current can be performed by approaching all possible positions in the full circle.

Figure 5:
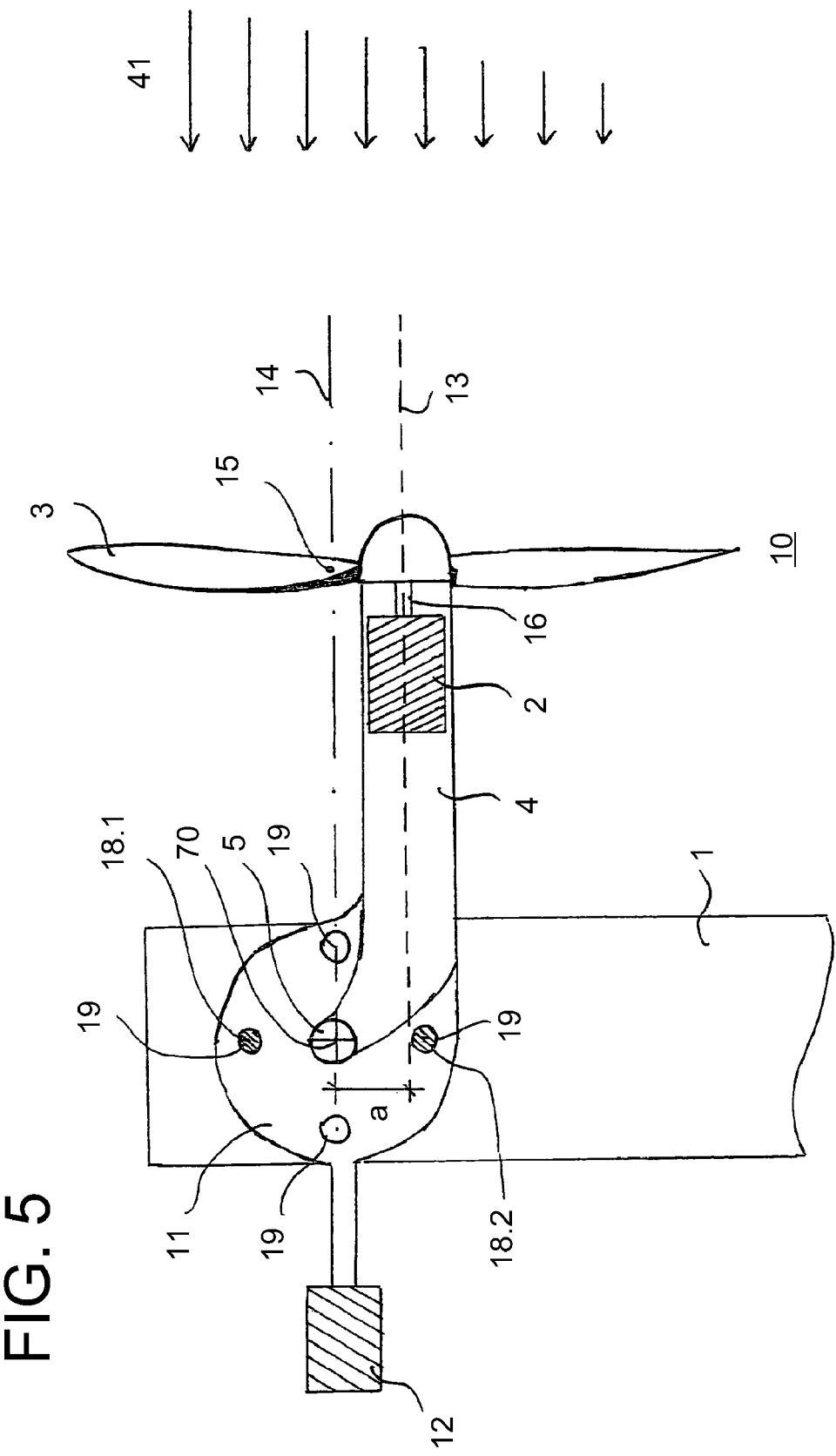
FIG. 5 shows a side view of an embodiment for a pivoting movement about a horizontal pivoting axis.

FIG. 5 shows an embodiment in accordance with the present invention in which axis of rotation 70 associated with pivot joint 5 extends horizontally. Accordingly, the unit consisting of turbine 3 and spacer element 4 pivots about the fulcrum predetermined by axis of rotation 70 on the pivot joint to support structure 1 in a vertical plane.

The variant of the present invention as shown in FIG. 5 can reduce static moments in operation as a generator. In the present case, an asymmetric inflow direction of turbine 3 is discussed. Flow profile 41 is shown, by way of example, which is asymmetric to turbine shaft 16. Flow profile 41 occurs as a result of the finite distance of turbine 3 from the floor of the ocean. Accordingly, the upper portion of turbine 3 has faster inflow than the areas situated beneath the axis predetermined by turbine shaft 16. As a result, an off-center center of pressure 15 will be obtained according to present inflow profile 41 and the force action line of the turbine force in generator operation 14 will not correspond to the progress of turbine shaft 16. According to the arrangement shown in FIG. 5, pivot joint 5 for linking spacer element 4 to support structure 1 is moved to the area in which the force action line of the turbine force extends in generator operation 14. In the case of changing flow profile 41, however, center of pressure 15 will migrate, so that in the ideal case the force action line of the turbine force will pass precisely through the fulcrum of pivot joint 5 in generator operation. However, the characteristics of flow profile 41 will generally be maintained, so that the torque acting upon pivot joint 5 will be reduced in generator operation by the lateral spacing of pivot joint 5 to turbine shaft 16.

Moreover, counterweight 12 can be arranged according to an embodiment of the present invention in such a way that as a result of the weight of turbine 3 and spacer element 4, and the components received therein such as electric machine 2, for example, resulting torque on pivot joint 5 is balanced out. This reduces the static moments to be supported during operation as a generator and simultaneously allows a simplification of the pivoting movements as a result the balanced weight distribution.

FIG. 5 further shows the progress of the force action line of propulsive power 13 in the case of the drive of turbine 3 by electric machine 2. The force action line of propulsive power 13 coincides for the chosen propeller-like arrangement of turbine 3 with the axis of turbine shaft 16. Pivot joint 5 has a perpendicular distance to the force line of propulsive power 13. It is shown in FIG. 5 as lateral offset a. As explained above, lateral offset a is arranged in such a way that the temporally averaged position of the force action line of the turbine power in generator operation 14 passes through the fulcrum of pivot joint 5. Instead of, or in addition to, temporal averaging it is possible to use a power-weighted averaging for determining the middle position of center of pressure 15 and the thus linked force action line of the turbine power in generator operation 14 as a design parameter for lateral offset a.

FIG. 5 further shows disk-like element 11 as a possible arrangement of pivot joint 5 which is used, on the one hand, to fix a pivoting movement to a movement in a pivoting plane. It is possible, on the other hand, to latch stop and locking elements 18.1, 18.2 which are provided at a certain distance to axis of rotation 70 on support structure 1, and which engage in respectively formed counterparts, typically recesses 19, in disk-like element 11. The arrangement of recesses 19, as shown in FIG. 5, show that in addition to illustrated first position 10, second position (not shown) of turbine 3 can be set which is turned by 180° relative to first position 10. Positions at 90° and 270° can additionally be set with, for example, the position at the upper apex with upwardly facing turbine 3 representing a service position for performing maintenance work. This will be shown below by reference to an embodiment of the present invention of a generic power generating plant with several turbines 3 connected via a support beam.

Figure 6A:
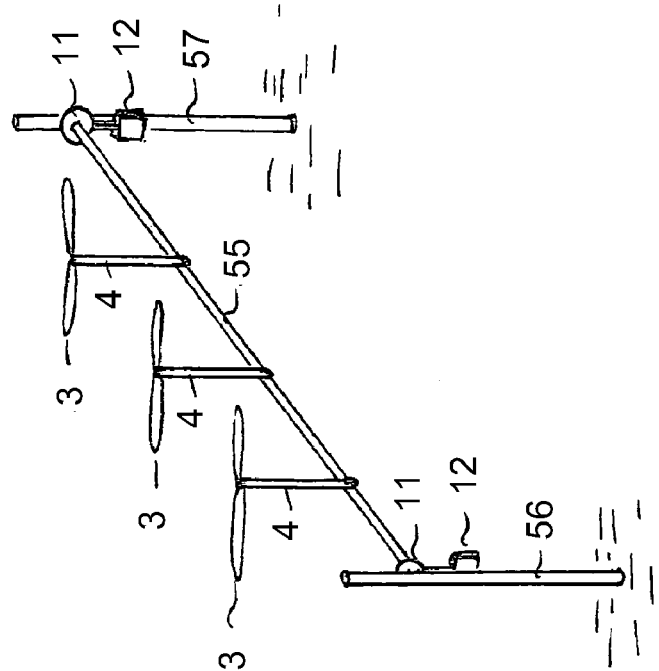
FIGS. 6a, 6b show the arrangements of several turbines in two different positions on a support beam rotatable about the longitudinal axis.

FIG. 6A illustrates the arrangement of three turbines 3 on common support structure 1. It comprises first pillar 56, second pillar 57 and support beam 55 to which units consisting of spacer element 4 and turbine 3 are fastened. The fastening is chosen in this case in such a way, in accordance with the present invention, that for each turbine 3 the force action line of propulsive power 13 has lateral offset a relative to the central axis of support beam 55. Support beam 55 is rotatably held via pivot joints 5 associated to first pillar 56 and second pillar 57. In this case, axis of rotation 70 corresponds to the central axis of support beam 55. A rotation about axis of rotation 70 is achieved in accordance with the present invention in such a way that at least one turbine 3 is motively driven by associated electric machine 2 and a pivoting movement about axis of rotation 70 occurs as a result of the offset arranged unit of spacer element 4 and turbine 3 for arranged turbine 3. Lateral offset a for the individual units can be chosen differently. Moreover, lateral offset a, which is associated with a specific unit of turbine 3 and spacer element 4, can be arranged upwardly or downwardly with respect to the central axis of support beam 55.

According to the embodiment of the present invention designated in FIG. 6A, pivot joint 5 is provided with disk-like element 11, being attached to first pillar 56 and second pillar 57. Moreover, two counterweights 12 are provided which are arranged as close as possible on first post 56 and second post 57 respectively. The obstruction is minimized concerning the inflow of turbine 3 and for reducing the bending load on support beam 55.

Figure 6B:
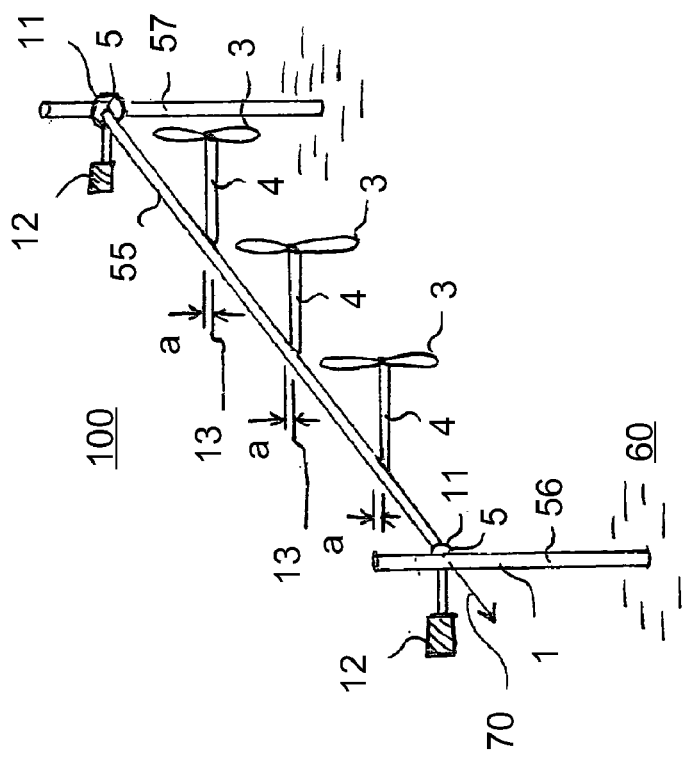

FIG. 6B shows the arrangement of FIG. 6A after a pivot was performed to a service position. This means that the shafts of turbines 3 stand vertically and turbines 3 are situated at the upper apex. In this position turbines 3 are moved as close as possible to the water surface. In addition, an apparatus can be provided in order to further lift turbines 3 from this position. This can be realized, for example, by a vertically displaceable unit on support structure 1 or spacer elements 4 are extended for this case or there is a separation of turbine 3 from associated spacer element 4 in conjunction with upward floating of turbine 3 to the water surface. As an alternative, a separation at the linkage point of respective spacer element 4 to support beam 55 can be provided.

Figure 7:
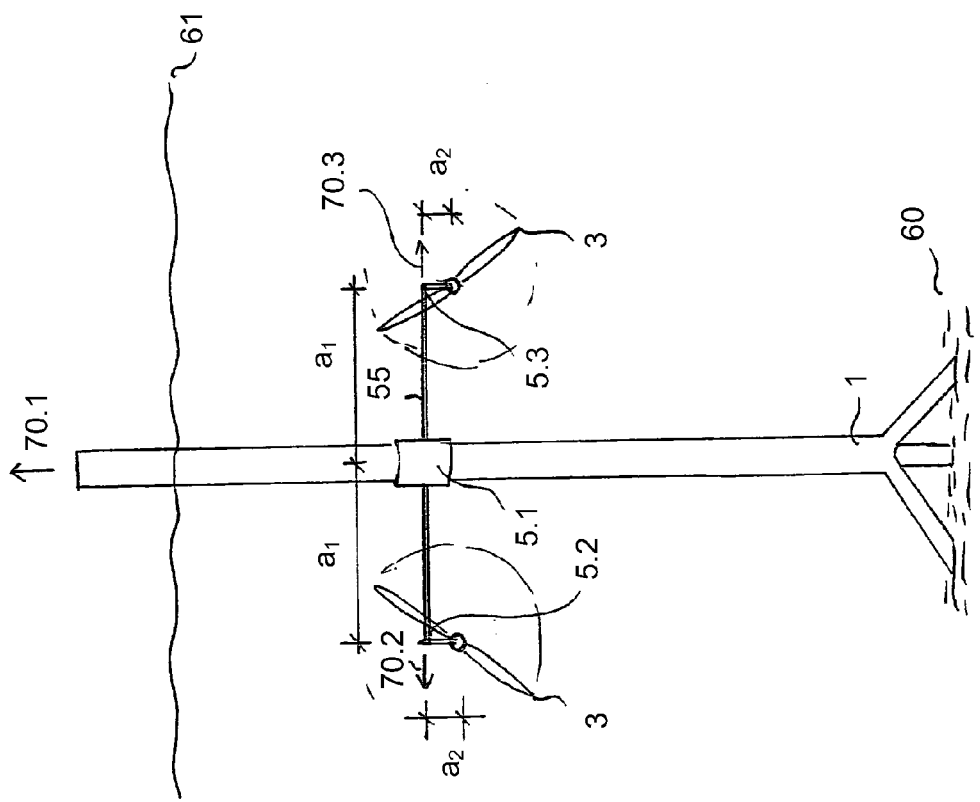
FIG. 7 shows an embodiment of the present invention with two turbines and a plurality of pivot joints.

A further embodiment of the present invention is shown in FIG. 7. Two turbines 3 of propeller-like structure are shown whose orbits lie in the plane of the drawing in normal generator operation. Turbines 3 are fastened to support structure 1, which is arranged as a pillar standing on the floor of the ocean and whose upper end protrudes beyond water surface 61.

Figure 8A:
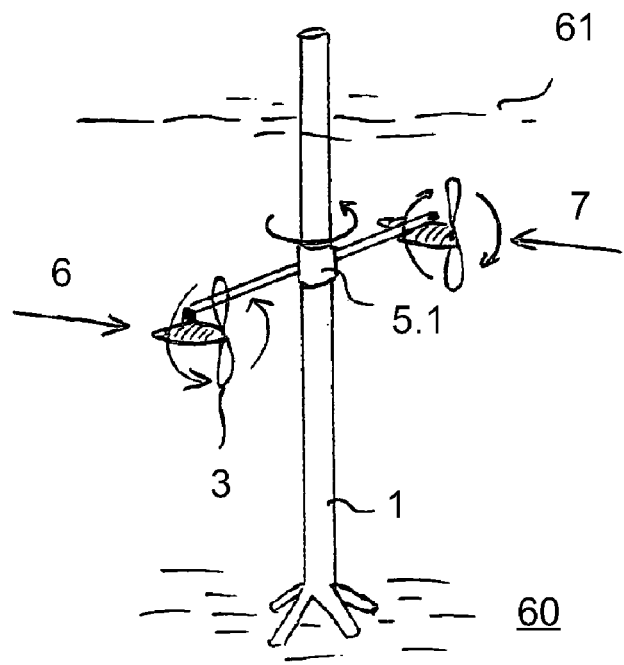
FIGS. 8a, 8b show possible pivoting movements for the embodiment of the present invention shown in FIG. 7.
Figure 8B:
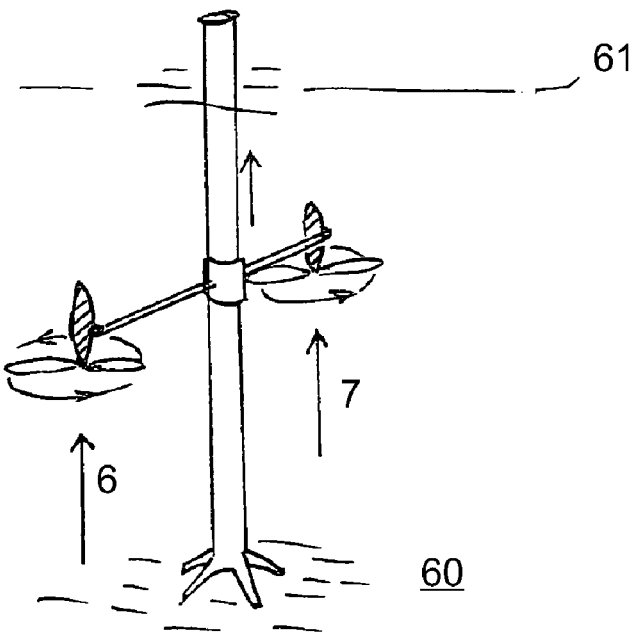

For adjustment to a changing direction of current, turbines 3 need to be turned about first axis of rotation 70.1 which extends along pillar-like support structure 1. The rotation will occur about first pivot joint 5.1, with the pivoting moment necessary for this purpose occurring in accordance with the present invention by the motive drive of at least one turbine 3 in conjunction with an eccentric linkage of the same by means of first lateral offset a1 relative to first pivot joint 5.1. Such a rotation is shown in FIG. 8A. In addition, there are second and third axis of rotation 70.2 and 70.3 each and second and third pivot joint 5.2, 5.3 for two turbines 3. Opposite of said linkage points, turbines 3 are arranged eccentrically by second lateral offset a2 for generating a lever. According to the method in accordance with the present invention as described above, it is possible as a result of this arrangement to pivot each of turbines 3 in a plane which stands perpendicular to the plane of the drawing. This is shown in FIG. 8B. It can be thus ensured that the turbines are positioned in such a way that during the motive drive of the same the propulsive power faces vertically with such a setting being used to displace the entire turbine unit along vertical support structure 1 upwardly to water surface 61 in order to enable carrying out maintenance or repair.

The principle in accordance with the present invention to cause the motive power for a pivoting movement of turbine 3 through motive operation of electric machine 2 associated with turbine 3 and to arrange a module of spacer element 4 and turbine 3 in an eccentric way relative to pivot joint 5 for generating a pivoting moment can be modified in different ways within the scope of protection of the following claims in order to enable active positioning of turbine 3 for optimal power input or for accessing certain service points actively.

LIST OF REFERENCE NUMERALS

1 Support structure
2 Electric machine
3 Turbine
4 Spacer element
5 Pivot joint
5.1 First pivot joint
5.2 Second pivot joint
5.3 Third pivot joint
6 First direction of propulsion
7 Second direction of propulsion
8 Radial force component
9 Tangential force component
10 First position
11 Disk-like element
12 Counterweight
13 Force action line of the propulsive power
14 Force action line of turbine force in generator operation
15 Center of pressure
16 Turbine shaft
17.1 Stop and locking element
17.2 Stop and locking element
17.3 Stop and locking element
18.1 Stop and locking element
18.2 Stop and locking element
19 Recess
20 Second position
30 First inflow direction
40 Second inflow direction
41 Flow profile
50 Sunk bolt
51 Bolt drive
52 Stop surface
53 Bore
55 Support beam
56 First pillar
57 Second pillar
60 Ocean floor
61 Water surface
70 Joint axis 70.1 First axis of rotation
70.2 Second axis of rotation
70.3 Third axis of rotation
80 Force action line
90 Propulsive power
100 Underwater power station
a Lateral offset
a1 First lateral offset
a2 Second lateral offset While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an underwater power station, the method comprising the steps of:
providing a support structure including a pivot joint;
providing at least one electric machine configured to be operated as one of a generator and a motor;
providing at least one turbine in an at least indirect drive connection with said electric machine, wherein said at least one turbine is fastened to said pivot joint of said support structure with a spacer element;
driving said at least one turbine with ambient water current when said at least one electric machine is operated as a generator;
generating torque by driving said at least one turbine with said electric machine in motive operation; and
pivoting said at least one turbine and said spacer element as a unit from a first position to a second position about a joint axis of said pivot joint with said generated torque.

2. The method according to claim 1, wherein said at least one turbine generates a tangential force component which extends perpendicularly to a connecting line between a place of introduction of force of said at least one turbine on said spacer element and a fulcrum for a pivoting movement on said pivot joint.

3. The method according to claim 2, wherein said first position and said second position are determined by a plurality of mechanical stops limiting said pivoting movement of said unit of said at least one turbine and said spacer element.

4. The method according to claim 3, further comprising the step of moving at least one of said plurality of mechanical stops out of a pivoting range of said unit.

5. The method according to claim 4, further comprising the step of providing a braking element, said braking element generating a braking moment against said pivoting when said pivoting is performed.

6. The method according to claim 5, wherein said braking moment is one of controlled and adjusted.

7. The method according to claim 6, wherein said pivoting movement is from said first position to said second position, said second position being reached when said braking moment exceeds said pivoting moment.

8. The method according to claim 7, wherein a latching secures against rearward movement after said pivoting movement.

9. The method according to claim 8, wherein said joint axis extends one of vertically and horizontally.

10. The method according to claim 9, wherein said pivoting movement is a forward movement and a rearward movement between a first position wherein said at least one turbine is aligned for a first inflow direction and a second position in which said at least one turbine is aligned for a second inflow direction.

11. The method according to claim 10, wherein said pivoting movement is performed up to one of a maintenance and a neutral position.

12. An underwater power station comprising:
a support structure;
at least one turbine;
at least one electric machine configured to be operated as one of a generator and a motor, wherein said at least one electric machine is in an at least indirect drive connection with said at least one turbine and said at least one electric machine in a motive operation is configured to drive said at least one turbine to produce a propulsive power; and
a spacer element between said at least one turbine and said support structure, wherein said at least one turbine is attached to one end of said spacer element and a pivot joint to said support structure is attached to an opposing end of said spacer element, a linkage point of said pivot joint having an eccentricity which is a lateral offset to a force action line of said propulsive power.

13. The underwater power station according to claim 12, wherein said electric machine is integrated in said spacer element.

14. The underwater power station according to claim 13, further comprising a unit including said at least one turbine and said spacer element and a stop and a locking element configured to be a mechanical stop for a pivoting movement of said unit and to lock when said unit lies on said mechanical stop.

15. The underwater power station according to claim 14, further comprising a damping apparatus associated with said at least one of said stop and locking element.

16. The underwater power station according to claim 15, further comprising a braking apparatus configured to generate a braking force to act against said pivoting movement.

17. The underwater power station according to claim 16, wherein said braking apparatus is configured to generate one of a controlled and a regulated braking force.

18. The underwater power station according to claim 17, wherein an averaged force action line of a turbine force extends substantially through said pivot joint when a flow profile is present on said at least one turbine.

19. The underwater power station according to claim 18, further comprising a counterweight configured to balance out a static torque about said joint axis, said static torque being generated by a weight of said at least one turbine and said spacer element.

20. The underwater power station according to claim 19, wherein said at least one turbine is at least two turbines, each of said at least two turbines being indirectly connected to another of said at least two turbines and wherein said at least two turbines have a common support structure.

21. The underwater power station according to claim 20, wherein said at least two turbines are connected through an element with an associated axis which coincides with said joint axis.

22. The underwater power station according to claim 21, wherein said turbine is associated with a plurality of said pivot joints, said at least one turbine having an eccentric linkage to each of said plurality of pivot joints.

* * * * *